(12) United States Patent
Bae et al.

(10) Patent No.: US 8,264,332 B2
(45) Date of Patent: *Sep. 11, 2012

(54) APPARATUS AND METHOD FOR DEMODULATING SUBCARRIER TAG SIGNAL IN RFID READER

(75) Inventors: Ji-Hoon Bae, Daejeon (KR); Donghan Lee, Daejeon (KR); Won Kyu Choi, Daejeon (KR); Cheng-Hao Quan, Daejeon (CN); Gil Young Choi, Daejeon (KR); Jong-Suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 865 days.

This patent is subject to a terminal disclaimer.

(21) Appl. No.: 12/348,529

(22) Filed: Jan. 5, 2009

(65) Prior Publication Data

US 2010/0039227 A1    Feb. 18, 2010

(30) Foreign Application Priority Data

Aug. 13, 2008  (KR) .................. 10-2008-0079337

(51) Int. Cl.
*G08B 21/00* (2006.01)
(52) U.S. Cl. ............... 340/12.17; 340/12.22; 340/12.23; 340/12.5; 340/10.1; 341/176; 398/106; 348/734
(58) Field of Classification Search ............ 375/242, 375/287, 360; 340/5.22, 825.22, 825.65, 340/825.69, 825.72, 12.17, 12.22, 12.23, 12.5, 13.25; 341/176; 398/106; 348/734
See application file for complete search history.

(56) References Cited

U.S. PATENT DOCUMENTS

| 6,757,341 | B1* | 6/2004 | Ema et al. ..................... 375/333 |
| 7,026,935 | B2 | 4/2006 | Diorio et al. |
| 2002/0153476 | A1* | 10/2002 | Rokugawa et al. ....... 250/214 A |
| 2006/0115003 | A1* | 6/2006 | Kari et al. ..................... 375/242 |
| 2008/0129505 | A1* | 6/2008 | Lin et al. .................... 340/572.1 |
| 2008/0205558 | A1* | 8/2008 | Arnitz .......................... 375/340 |

FOREIGN PATENT DOCUMENTS

| KR | 10-2007-0036624 | 4/2007 |
| KR | 10-0765204 | 10/2007 |
| KR | 100768100 B1 | 10/2007 |
| KR | 100771487 B1 | 10/2007 |

* cited by examiner

*Primary Examiner* — Jennifer Mehmood
*Assistant Examiner* — Mark Rushing
(74) *Attorney, Agent, or Firm* — Kile Park Goekjian Reed & McManus PLLC

(57) ABSTRACT

An apparatus and a method for demodulating a subcarrier tag signal in a radio frequency identification (RFID) reader is provided. The apparatus for demodulating the subcarrier tag signal in the RFID reader may include: an edge signal generation unit receiving a subcarrier tag signal and generating an edge signal with respect to the tag signal; an edge information extraction unit extracting edge information from the generated edge signal; and a decoding unit decoding the tag signal using the extracted edge information.

10 Claims, 8 Drawing Sheets

APPARATUS AND METHOD FOR DEMODULATING SUBCARRIER TAG SIGNAL IN RFID READER

CROSS-REFERENCE TO RELATED APPLICATION

This application claims the benefit of Korean Patent Application No. 10-2008-0079337, filed on Aug. 13, 2008, in the Korean Intellectual Property Office, the disclosure of which is incorporated herein by reference.

BACKGROUND OF THE INVENTION

1. Field of the Invention

The present invention relates to an apparatus and a method for demodulating subcarrier tag signal in radio frequency identification (RFID) reader. This work was supported by the IT R&D program of MKE/IITA [2008-F-052-01, The Development of next generation radio frequency identification (RFID) for Application of Individual Product Unit].

2. Description of Related Art

Generally, radio frequency identification (RFID) is a technology which uses radio frequencies to wirelessly communicate with a tag having unique identification information, thereby identifying, detecting, and managing objects, animals, and human beings with the tag attached. An RFID system consists of a plurality of electronic tags or transponder which are attached to objects or animals, and an RFID reader or an RFID interrogator for reading information from the tag or writing one into the tag.

The RFID system is divided into a mutual induction scheme and an electromagnetic wave scheme depending on a mutual communication scheme between the reader and the tag, divided into an active type and a passive type depending on whether the tag operates with self power, and divided into a long wave type, a mid wave type, a short wave type, and a microwave type.

Also, since the RFID reader communicating with the passive RFID tag is required to consecutively supply the passive RFID tag with transmission energy (TX CW) while receiving a tag signal, a great amount of a transmission energy (TX CW) component can leak to a receiver in the RFID unless separation of transmission/reception is sufficiently guaranteed.

The transmission energy (TX CW) component leaked to the receiver in the RFID reader may cause a DC-offset noise in a baseband of the RFID reader. This DC-offset noise can severely deteriorate the performance of the demodulation of the tag signal in the RFID reader. Consequently, the RFID reader may not successfully restore an original signal from the corrupted signal with the DC-offset noise.

SUMMARY OF THE INVENTION

An aspect of the present invention provides an apparatus and a method for demodulating a tag signal which can enhance reliability with respect to demodulation of the tag signal, even when a DC-offset noise occurs in the tag signal, by performing demodulation with respect to the subcarrier tag signal using an edge signal whose subcarrier is removed.

An aspect of the present invention also provides an apparatus and a method for demodulating a received tag signal which can demodulate the received tag signal according to an amplitude shift keying (ASK) scheme or a binary phase shift keying (BPSK) scheme by extracting an edge signal and an edge component of the received tag signal regardless of a modulation scheme of the tag signal.

An aspect of the present invention also provides an apparatus and a method which can implement phase diversity with a simple structure even when the phase of the received signal in an RFID reader is changed depending on a distance between a RFID tag and the RFID reader since an edge component is used when demodulating and decoding a signal.

The present invention is not limited to the above purposes and other purposes not described herein will be apparent to those of skill in the art from the following description.

According to an aspect of the present invention, there is provided an apparatus for demodulating a subcarrier tag signal in an RFID reader including: an edge signal generation unit receiving a subcarrier tag signal and generating an edge signal with respect to the tag signal; an edge information extraction unit extracting edge information from the generated edge signal; and a decoding unit decoding the tag signal using the extracted edge information.

The edge signal generation unit may detect a location where a phase inverse occurs from the tag signal and generate the edge signal in the detected location.

The edge information extraction unit may detect a peak point of the edge signal by comparing at least one previous sample value with a present sample value of the generated edge signal, and extract the edge information using the detected peak point.

The edge information extraction unit may calculate an upper difference value (dx_high) and a lower difference value (dx_low) based on the current amplitude value (X(n)) associated with a current sample point in time. The upper difference value is obtained by calculating the difference between the next amplitude value (X(n+dn)) associated with the following sample point and the current amplitude value (X(n)). The lower difference value is obtained by calculating the difference between the current amplitude value (X(n)) and the previous amplitude value (X(n−dn)) associated with a sample point prior to the current sample point. From the calculated upper and lower difference values, the edge information extraction unit can detect a point where a tilt of the generated edge signal changes from positive to negative, and regards the detected point as the peak point.

The edge information extraction unit may generate an edge clock using the extracted edge information, and the decoding unit may determine bit data using the generated edge clock, detect a preamble of the tag signal using the determined bit data, and decode the tag signal using the detected preamble.

According to an aspect of the present invention, there is a provided a method for demodulating a subcarrier tag signal in an RFID reader including: receiving a subcarrier tag signal and generating an edge signal with respect to the tag signal; extracting edge information based on the generated edge signal; and decoding the tag signal using the extracted edge information.

The receiving of the subcarrier tag signal and the generating of the edge signal with respect to the tag signal may include: detecting a location where a phase inverse occurs based on the tag signal; and generating the edge signal in the detected location.

The extracting of the edge information from the generated edge signal may include: detecting a peak point of the edge signal by comparing at least one previous sample value with a present sample value of the generated edge signal; and extracting the edge information using the detected peak point.

The detecting of the peak point of the edge signal by comparing at least one previous sample value with the present sample value of the generated edge signal may include: calculating an upper difference value (dx_high) and a lower difference value (dx_low) based on the current amplitude value (X(n)) associated with a current sample point in time. The upper difference value is obtained by calculating the difference between the next amplitude value (X(n+dn)) associated with the following sample point and the current amplitude value (X(n)). The lower difference value is obtained by calculating the difference between the current amplitude value (X(n)) and the previous amplitude value (X(n−dn)) associated with a sample point prior to the current sample point. From the calculated upper and lower difference values, the edge information extraction unit can detect a point where a tilt of the generated edge signal changes from positive to negative, and regards the detected point as the peak point.

The extracting of the edge information from the generated edge signal may include: determining bit data using the generated edge clock; detecting a preamble of the tag signal using the determined bit data; and decoding the tag signal using the detected preamble.

Other detailed descriptions with respect to other embodiments are included in the detailed description of exemplary embodiments and the accompanying drawings.

According to the present invention, it is possible to enhance reliability for demodulation of a tag signal even when a DC-offset noise occurs in the tag signal by performing demodulation with respect to a subcarrier tag signal using an edge signal whose subcarrier is removed.

Also, according to the present invention, it is possible to demodulate a received tag signal according to an amplitude shift keying (ASK) or binary phase shift keying (BPSK) scheme by extracting an edge signal and an edge component of the received tag signal regardless of a modulation scheme of the tag signal.

Also, according to the present invention, it is possible to implement phase diversity with a simple structure even when the phase of the received signal in an RFID reader is changed depending on a distance between RFID tag and the RFID reader since an edge component of the received signal is used when demodulating and decoding the signal.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Reference will now be made in detail to exemplary embodiments of the present invention, examples of which are illustrated in the accompanying drawings, wherein like reference, numerals refer to the like elements throughout. The exemplary embodiments are described below in order to explain the present invention by referring to the figures.

Figure 1:
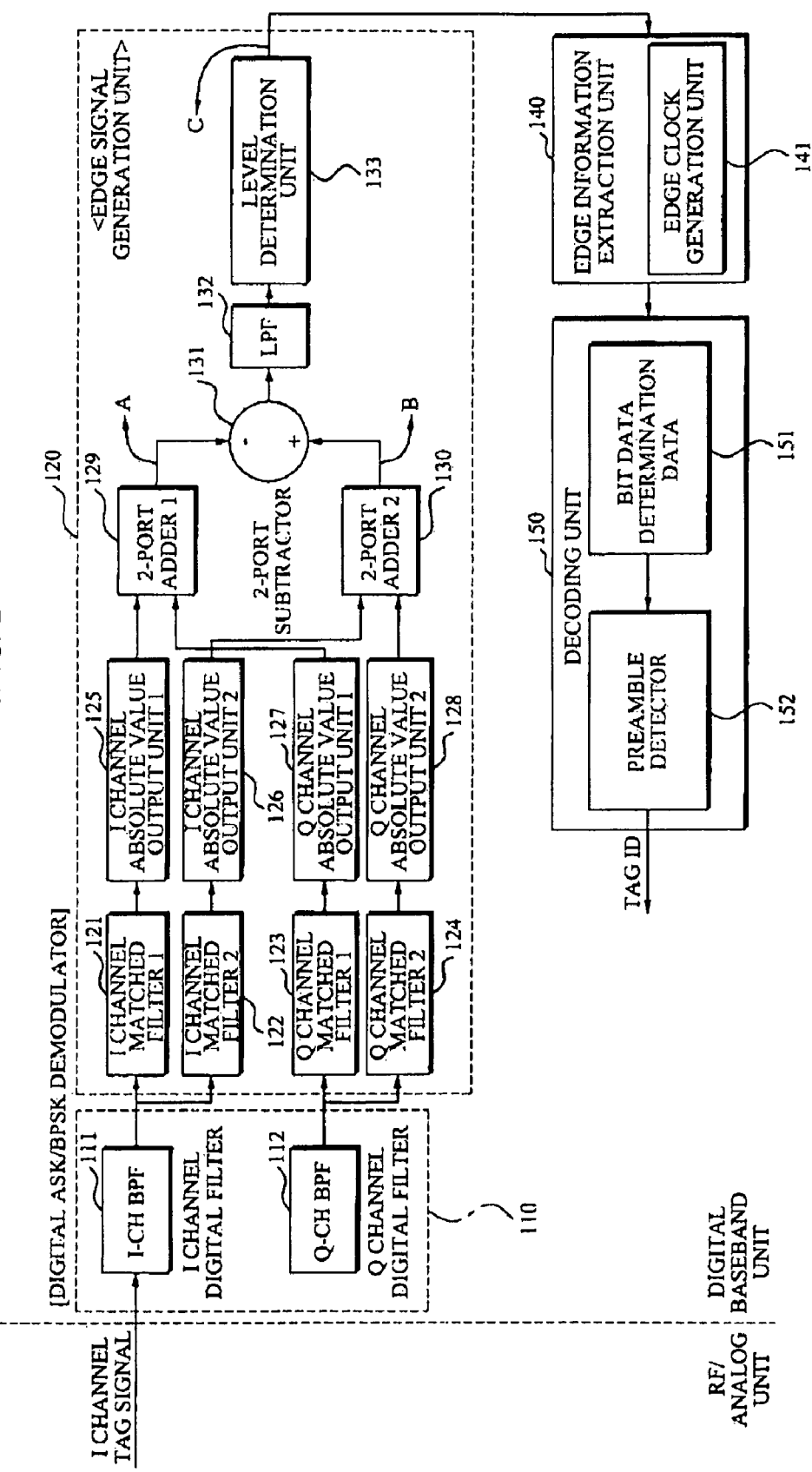
FIG. 1 is a block diagram illustrating an apparatus for demodulating a subcarrier tag signal in a radio frequency identification (RFID) reader according to an exemplary embodiment of the present invention.

FIG. 1 is a block diagram illustrating an apparatus for demodulating a subcarrier tag signal in a radio frequency identification (RFID) reader according to an exemplary embodiment of the present invention.

Referring to FIG. 1, the apparatus for demodulating the subcarrier tag signal in the RFID reader may include a digital filter 110, an edge signal generation unit 120, an edge information extraction unit 140, and a decoding unit 150.

The digital filter 110 may include an In-phase (I) channel digital filter 111 and a Quadrature-phase (Q) channel digital filter 112. The I channel digital filter 111 performs bandpass filtering with respect to a Miller subcarrier signal, thereby removing undesired low frequency, high frequency, and noise components of the tag signal being inputted in an I channel. The Q channel digital filter 112 performs bandpass filtering with respect to a Miller subcarrier signal, thereby removing undesired low frequency, high frequency, and noise components of the tag signal which are inputted in a Q channel.

The edge signal generation unit 120 may generate an edge signal with respect to the received subcarrier tag signal. In this instance, the edge signal generation unit 120 may detect a location where a phase inverse occurs from the tag signal and generate the edge signal in the detected location.

The edge signal generation unit 120 may include an I channel matched filter (1) 121, and I channel matched filter (2) 122, a Q channel matched filter (1) 123, a Q channel matched filter (2) 124, an I channel absolute value output unit (1) 125, an I channel absolute value output unit (2), 126, a Q channel absolute value output unit (1) 127, a Q channel absolute value output unit (2) 128, an adder (1) 129, an adder (2) 130, a subtractor 131, a low pass filter (LPF) 132, and a level determination unit 133.

The edge signal generation unit 120 may match output signals of the I channel digital filter 111 and Q channel digital filter 112 using the four matched filters 121, 122, 123, and 124, and obtain absolute values using the four absolute value output units 125, 126, 127, and 128 to output the absolute values. The edge signal generation unit 120 may sum up the absolute values using the adder (1) 129 and the adder (2) 130 and subtract output values of the two adders 129 and 130 via the subtractor 131 to output the subtracted value. The edge signal generation unit 120 may filter the output signal from the subtractor 131 via the LPF 132, and generate the edge signal by determining a level of the output signal from the LPF 132 via the level determination unit 133.

The edge information extraction unit 140 may extract edge information from the generated edge signal. In this instance, the edge information extraction unit 140 may detect a peak point of the edge signal by comparing at least one previous sample value with a present sample value of the generated edge signal, and extract the edge information using the detected peak point.

Specifically, the edge information extraction unit 140 may calculate an upper difference value (dx_high) and a lower difference value (dx_low) based on the current amplitude value (X(n)) associated with a current sample point in time. The upper difference value is obtained by calculating the difference between the next amplitude value (X(n+dn)) associated with the following sample point and the current amplitude value (X(n)). The lower difference value is obtained by calculating the difference between the current amplitude value (X(n)) and the previous amplitude value (X(n−dn)) associated with a sample point prior to the current sample point. The edge information extraction unit 140 may detect a point where a tilt of the generated edge signal changes from positive to negative using the calculated upper difference value and the lower difference value. Then, the edge information extraction unit 140 regards the detected peak point as the valid edge information.

The edge information extraction unit 140 may generate an edge clock using the extracted edge information. The edge clock may be generated by an edge clock generation unit 141 included in the edge information extraction unit 140.

The decoding unit 150 may decode the tag signal using the extracted edge information. That is, the decoding unit 150 may determine bit data using the generated edge clock in response to the extracted edge information, and decode the tag signal by detecting a preamble of the tag signal using the determined bit data.

The decoding unit 150 may include a bit data determination unit 151 and a preamble detector 152. The bit data determination unit 151 may determine bit data using the generated edge clock. The preamble detector 152 may detect a preamble of the tag signal using the determined bit data.

As described above, the apparatus for demodulating the subcarrier tag signal in the RFID reader generates an edge signal whose subcarrier is removed with respect to the subcarrier tag signal, and extracts the edge information from the generated edge signal to demodulate the extracted edge information, thereby enhancing reliability for demodulation of the tag signal even when a DC offset occurs in the received tag signal.

Also, the apparatus for demodulating the subcarrier tag signal in the RFID reader extracts an edge signal and an edge component (edge information) of a received tag signal regardless of a modulation scheme of the tag signal, thereby demodulating the received tag signal according to an amplitude shift keying (ASK) scheme or a binary phase shift keying (BPSK) scheme.

Also, the apparatus for demodulating the subcarrier tag signal in the RFID reader may implement phase diversity with a simple structure even when the phase of the received signal in an RFID reader receiver is changed according to a distance between an RFID tag and the RFID reader since an edge component is used when demodulating and decoding the signal.

Figure 2:
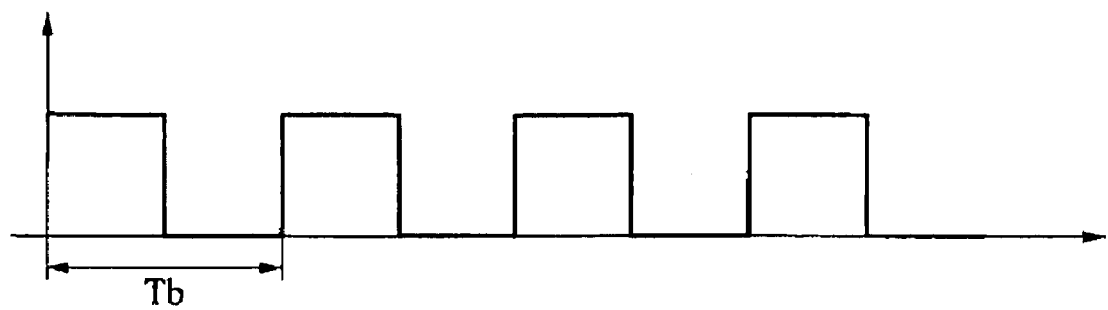
FIG. 2 is a graph illustrating a matched filter (1) of I and Q channels of FIG. 1.
Figure 3:
FIG. 3 is a graph illustrating a matched filter (2) of I and Q channels of FIG. 1.

FIG. 2 is a graph illustrating the I channel matched filter (1) 121 of FIG. 1 and the Q channel matched filter (1) 123 of FIG. 1, and FIG. 3 is a graph illustrating the I channel matched filter (2) 122 and Q channel matched filter (2) 124 of FIG. 1.

When the M value of a Miller subcarrier tag signal received from an RFID tag in an RFID reader is 4 (refer to the EPCglobal 18000-6c standard), the I channel matched filter (1) 121 and the Q channel matched filter (1) 123 have signal types shown in FIG. 2, and the I channel matched filter (2) 122 and the Q channel matched filter (2) 124 have signal types shown in FIG. 3.

That is, the I channel matched filter (1) 121 and the Q channel matched filter (1) 123 have the identical shapes of a symbol 0 of the Miller subcarrier signal, and the I channel matched filter (2) 122 and the Q channel matched filter (2) 124 have the identical shapes of a symbol I of a Miller subcarrier signal where a phase inverse occurs in the middle of signal.

Figure 4:
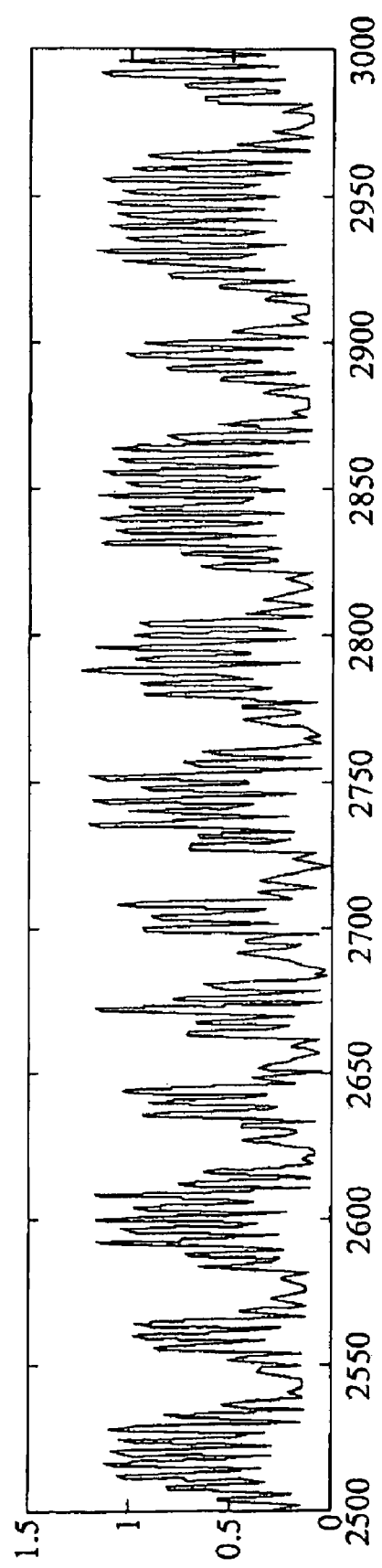
FIG. 4 is a graph illustrating a time-signal level indicating a signal outputted at point A in FIG. 1.
Figure 5:
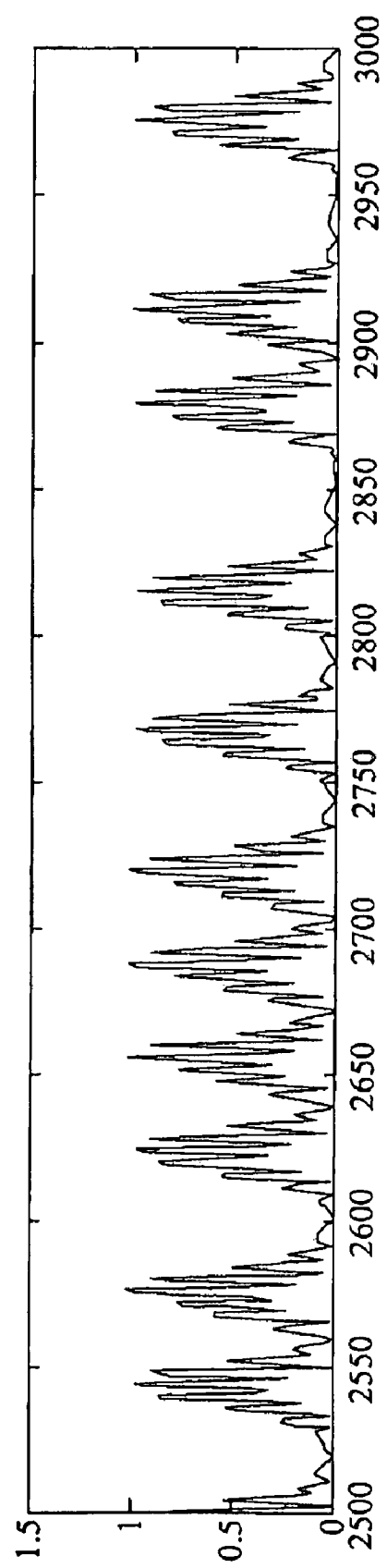
FIG. 5 is a graph illustrating a time-signal level indicating a signal outputted at point B in FIG. 1.

FIG. 4 is a graph illustrating a time-signal level indicating a signal outputted at point A in FIG. 1, and FIG. 5 is a graph illustrating a time-signal level indicating a signal outputted at point B in FIG. 1.

A signal shown in the graph of FIG. 4 is generated after the signals are received from the I channel digital filter 111 of FIG. 1 and the Q channel digital filter 112 of FIG. 1, and are outputted via the I channel matched filter (1) 121 of FIG. 1 and the Q channel matched filter (1) 123 of FIG. 1, the I channel absolute value output unit (1) 125 of FIG. 1 and the Q channel absolute value output unit (1) 127 of FIG. 1, and the adder 129 of FIG. 1.

A signal shown in the graph of FIG. 5 is generated after the signals are received from the I channel digital filter 111 of FIG. 1 and the Q channel digital filter 112 of FIG. 1, and are outputted via the I channel matched filter (2) 122 of FIG. 1 and the Q channel matched fitter (2) 124 of FIG. 1, the I channel absolute value output unit (2) 126 of FIG. 1 and the Q channel absolute value output unit (2) 128 of FIG. 1, and the adder 130 of FIG. 1.

Figure 6:
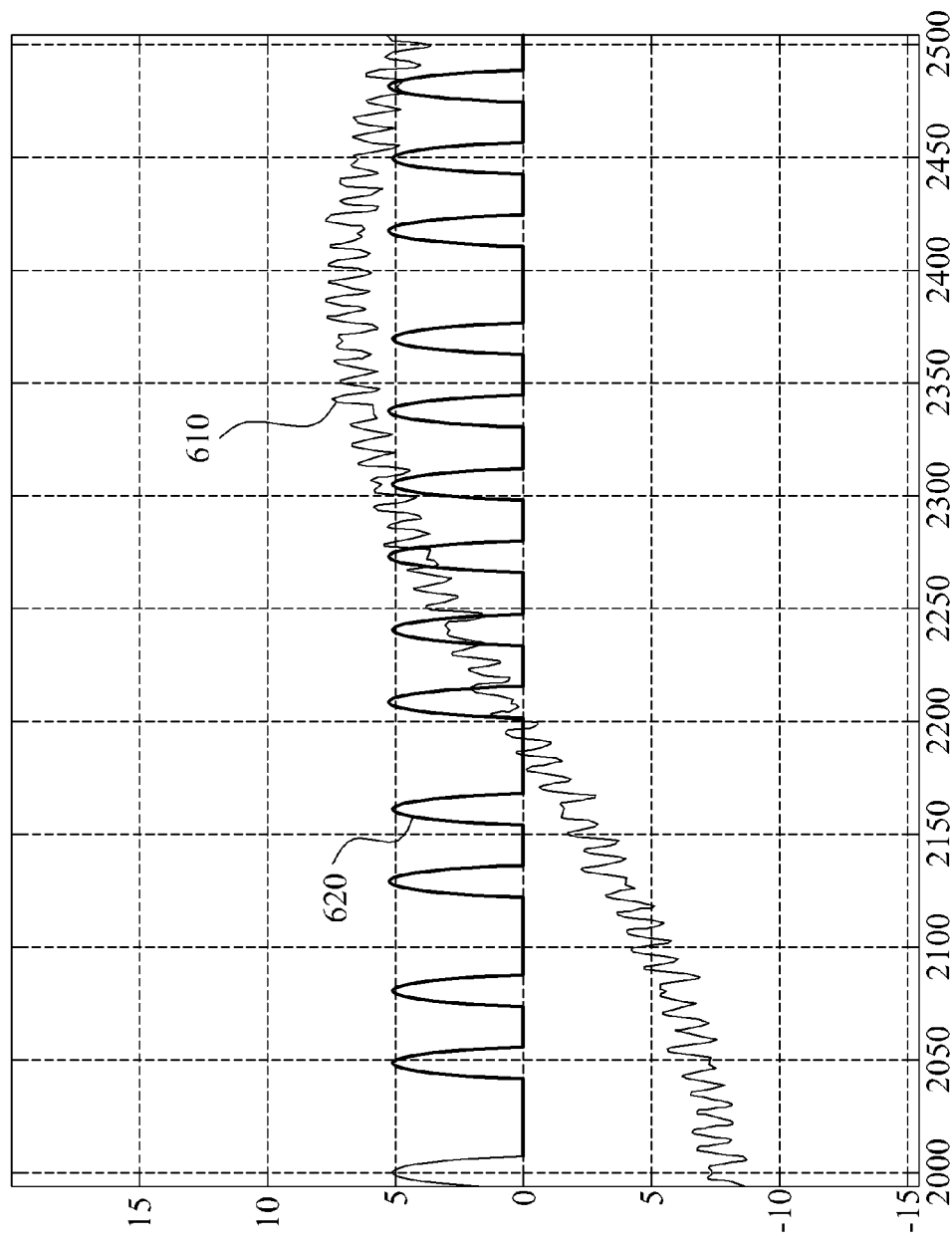
FIG. 6 is a graph illustrating a time-signal level indicating a signal outputted at point C in FIG. 1.

FIG. 6 is a graph illustrating a time-signal level indicating a signal outputted at point C in FIG. 1. An edge signal 620 indicates a signal outputted at point C in FIG. 1. The edge signal 620 may be generated as illustrated in FIG. 6 with respect to a tag signal 610 which is distorted due to a DC offset noise. That is, the edge signal 620 may be generated after the signals in FIGS. 4 and 5 being detected in points A and B of FIG. 1 are outputted via the subtractor 131 of FIG. 1, the LPF 132 of FIG. 1, and the level determination unit 133 of FIG. 1.

The edge signal 620 may occur in a location where a phase inversion occurs in a subcarrier tag signal. The edge signal 620 is transmitted to the edge information extraction unit 140 of FIG. 1, and may be used for detecting edge information.

Figure 7:
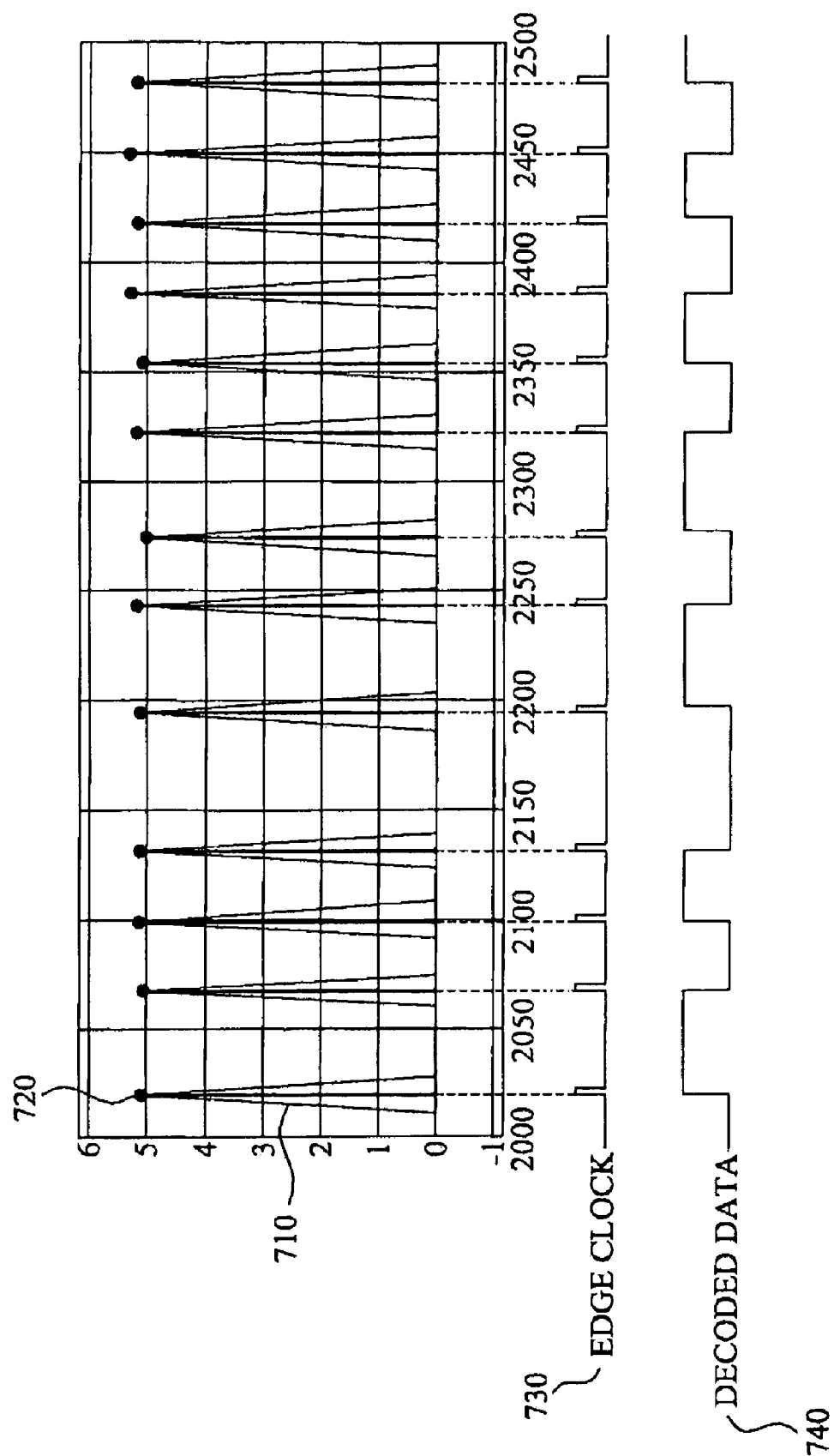
FIG. 7 is a graph illustrating edge information and the associated edge clock extracted by an edge information extraction unit of FIG. 1.

FIG. 7 is a graph illustrating edge information and an edge clock extracted by the edge information extraction unit 140 of FIG. 1.

As illustrated in FIG. 7 the edge information extraction unit 140 may extract edge information 720 using an edge signal 710. The edge information extraction unit 140 may generate an edge clock 730 using the extracted edge information 720. Accordingly, the decoding unit 150 of FIG. 1 may output decoded data 740 using the generated edge clock 710. In this instance the decoded data 740 shows timing drawing of a result that a tag signal whose subcarrier is removed is demodulated.

Figure 8:
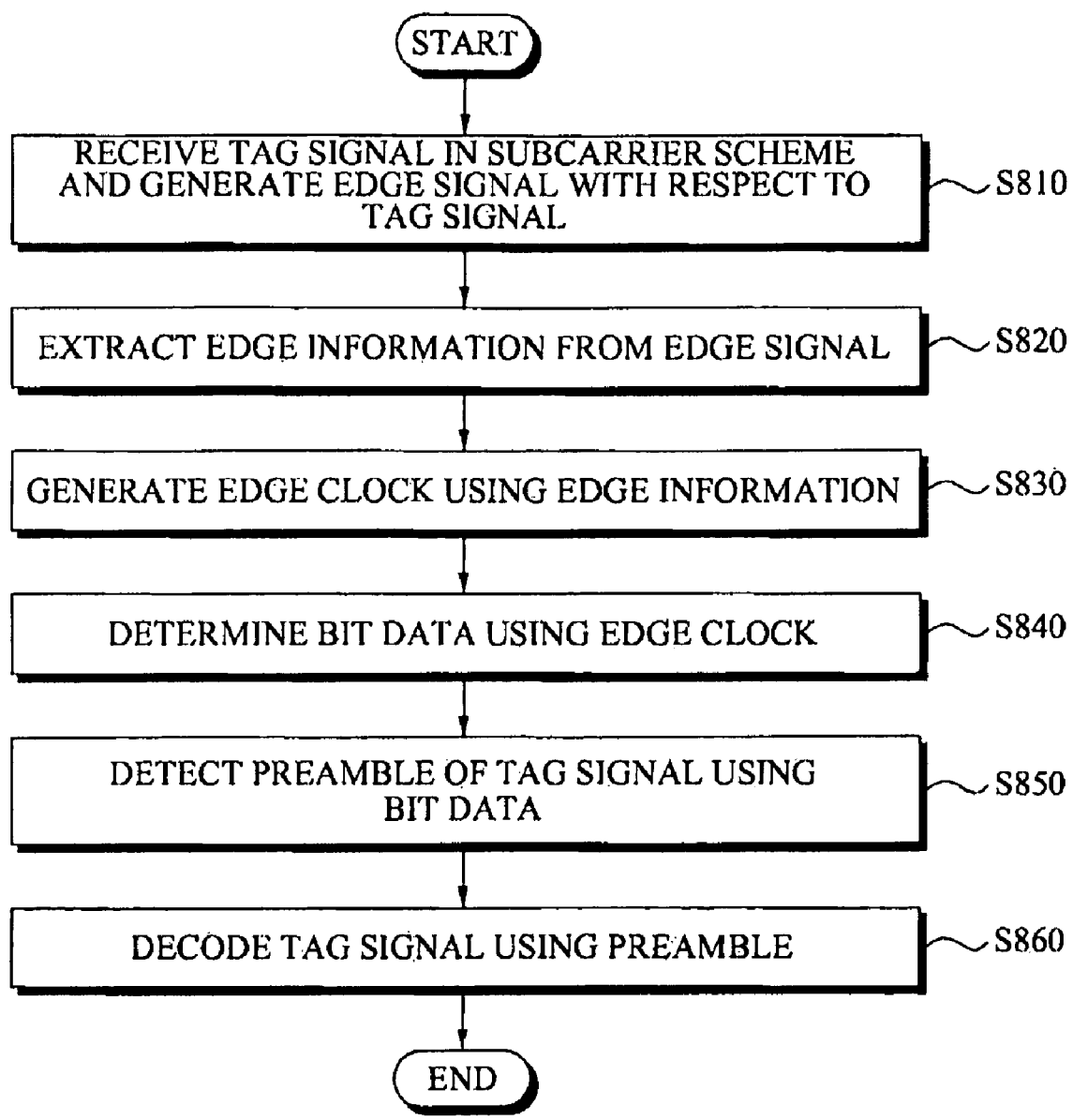
FIG. 8 is a flowchart illustrating a method for demodulating a subcarrier tag signal in an RFID reader according to an exemplary embodiment of the present invention.

FIG. 8 is a flowchart illustrating a method for demodulating a subcarrier tag signal in an RFID reader according to an exemplary embodiment of the present invention. The method for demodulating the subcarrier tag signal in the RFID may be implemented by the apparatus for demodulating the subcarrier tag signal in the RFID reader.

Referring to FIG. 8, the apparatus for demodulating the subcarrier tag signal in the RFID reader performs the bandpass filtering with respect to a Miller subcarrier signal, thereby removing undesired low frequency component high frequency component, and noise component of the tag signal being inputted in an I channel. Also, the apparatus for demodulating the subcarrier tag signal in the RFID reader performs the bandpass filtering with respect to the Miller subcarrier signal, thereby removing undesired low frequency component, high frequency component, and noise component of a tag signal being inputted in a Q channel.

In operation S810, the apparatus for demodulating the subcarrier tag signal in the RFID reader may receive a subcarrier tag signal and generate an edge signal with respect to the tag signal. In this instance, the apparatus for demodulating the subcarrier tag signal in the RFID reader may detect a location where a phase inverse occurs based on the tag signal, and generate the edge signal in the detected location.

In operation S820, the demodulation of the RFID reader may extract edge information from the generated edge signal. In this instance, the demodulation of the RFID reader may detect a peak point of the edge signal by comparing at least one previous sample value with a present sample value of the generated edge signal, and extract the edge information using the detected peak point.

In operation S830, the demodulation of the RFID reader may generate an edge clock using the extracted edge information.

In operation S840, the demodulation of the RFID reader may determine bit data using the generated edge clock.

In operation S850, the demodulation of the RFID reader may detect a preamble of the tag signal using the determined bit data.

In operation S860, the demodulation of the RFID reader may decode the tag signal using the detected preamble.

As described above, the apparatus for demodulating the subcarrier tag signal in the RFID reader generates the edge signal whose subcarrier is removed with respect to the subcarrier tag signal, and extracts the edge information from the generated edge signal to demodulate the edge information, thereby enhancing reliability with respect to the demodulation of the tag signal even when a DC offset noise occurs in the received tag signal.

Also, the apparatus for demodulating the subcarrier tag signal in the RFID reader, regardless of a modulation scheme of the tag signal, may extract the edge signal and edge information, and demodulate the extracted edge signal and edge information according to an ASK scheme or a BPSK scheme.

Also, the apparatus for demodulating the subcarrier tag signal in the RFID reader may implement phase diversity with a simple structure even when the phase of the received signal in an RFID reader receiver is changed according to a distance between an RFID tag and the RFID reader since an edge component is used when demodulating and decoding the tag signal.

Figure 9:
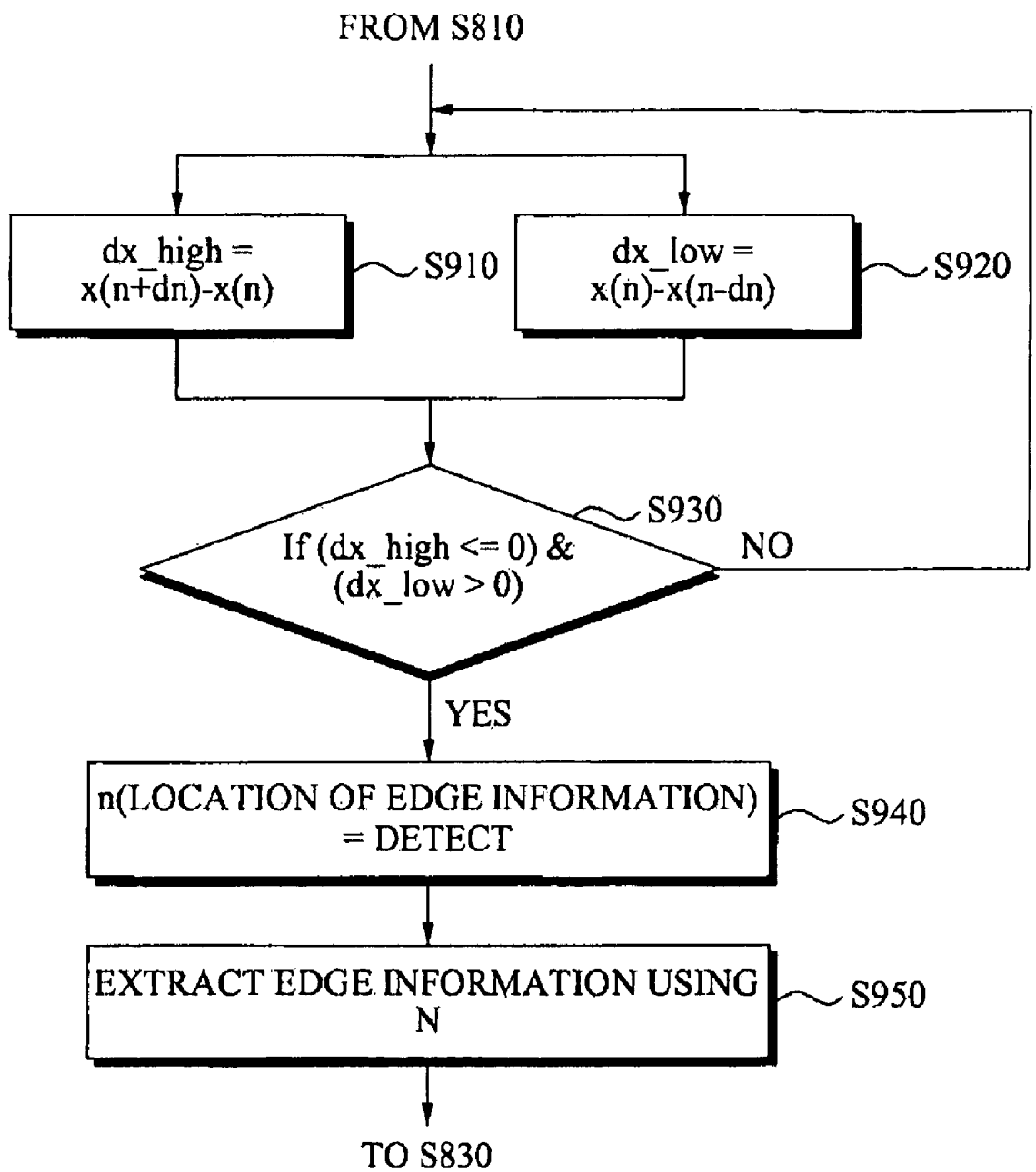
FIG. 9 is a diagram illustrating an algorithm for extracting edge information according to an exemplary embodiment of the present invention.

FIG. 9 is a diagram illustrating an algorithm of extracting edge information according to an exemplary embodiment of the present invention.

Referring to FIG. 9, the apparatus for demodulating the subcarrier tag signal in the RFID reader may compare at least one previous sample value with a present sample value of the generated edge signal, and calculate an upper difference value (dx_high) and a lower difference value (dx_low) based on the current amplitude value (X(n)) associated with a current sample point in time. In operations S910 and S920, dn may be natural numbers such as 1, 2, 3, . . . , and n. dn=1 indicates a right previous first sample value of the present sample, and dn=2 indicates a right previous second sample value of the first sample value.

In operation S930, the apparatus for demodulating the subcarrier tag signal in the RFID reader may determine whether a condition of an occurrence of the peak point is satisfied using the calculated upper difference value, dx_high and the lower difference value dx_low That is, the apparatus for demodulating the subcarrier tag signal in the RFID reader may determine, as the condition where the peak point occurs, the case where the upper difference value, dx_high is equal to or smaller than 0 and the lower difference value, dx_low is larger than 0. In other words, the apparatus for demodulating the subcarrier tag signal in the RFID reader may determine a point where a tilt of the edge signal changes from positive to negative as the condition where the peak point occurs.

In operation S940, the apparatus for demodulating the subcarrier tag signal in the RFID may detect the peak point 'n' (n: location of the edge information) when the above-mentioned conditions are satisfied ('Yes' direction in operation S930).

In operation S950, the apparatus for demodulating the subcarrier tag signal in the RFID may extract the edge information using the peak point 'n'. That is, the apparatus for demodulating the subcarrier tag signal in the RFID reader may extract the edge information from the calculated peak point 'n'.

The method for demodulating a subcarrier tag signal in an RFID reader according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for demodulating a subcarrier tag signal in a radio frequency identification (RFID) reader, the apparatus comprising:
   an edge signal generation unit receiving the subcarrier tag signal and generating an edge signal with respect to the tag signal;
   an edge information extraction unit extracting edge information from the generated edge signal; and
   a decoding unit decoding the tag signal using the extracted edge information,
   wherein the edge information extraction unit calculates an upper difference value and a lower difference value by comparing a present sample value of the edge signal with at least one previous sample value of the edge signal and detects a peak point of the edge signal using the upper difference value and the lower difference value, and the edge information is extracted using the detected peak point.

2. The apparatus of claim 1, wherein the edge signal generation unit detects a location where a phase inverse occurs in the tag signal, and generates the edge signal in the detected location.

3. The apparatus of claim 1, wherein the edge information extraction unit detects a point where a tilt of the generated edge signal changes from positive to negative using the calculated upper and lower difference values, and regards the detected point as the peak point.

4. The apparatus of claim 1, wherein the edge information extraction unit generates an edge clock using the extracted edge information, and the decoding unit determines bit data using the generated edge clock, detects a preamble of the tag signal using the determined bit data, and decodes the tag signal using the detected preamble.

5. The apparatus of claim 1, wherein the edge information extraction unit detects the peak point when the upper difference value is equal to or smaller than zero (0) and the lower difference value is larger than zero (0).

6. A method for demodulating a subcarrier tag signal in an RFID reader, the method comprising:
   receiving the subcarrier tag signal and generating an edge signal with respect to the tag signal;
   extracting edge information based on the generated edge signal; and
   decoding the tag signal using the extracted edge information,
   wherein the extracting edge information includes:
      calculating an upper difference value and a lower difference value by comparing a present sample value of the edge signal with at least one previous sample value of the edge signal;
      detecting a peak point of the edge signal using the upper difference value and the lower difference value; and
      extracting the edge information using the detected peak point.

7. The method of claim 6, wherein the receiving of the subcarrier tag signal and generating an edge signal with respect to the tag signal comprises:
   detecting a location where a phase inverse occurs in the tag signal; and
   generating the edge signal in the detected location.

8. The method of claim 6, wherein the detecting of the peak point of the edge signal comprises:
   detecting a point where a tilt of the generated edge signal turns from positive to negative using the calculated upper difference value and the lower difference value; and
   regarding the detected point as the peak point.

9. The method of claim 6, wherein the extracting of the edge information from the generated edge signal comprises generating an edge clock using the extracted edge information, and the decoding of the tag signal using the extracted edge information comprises:
   determining bit data using the generated edge clock;
   detecting a preamble of the tag signal using the determined bit data; and
   decoding the tag signal using the detected preamble.

10. The method of claim 6, wherein the peak point of the edge signal is detected when the upper difference value is equal to or smaller than zero (0) and the lower difference value is larger than zero (0).

* * * * *